May 21, 1940.  C. P. DEIBEL  2,201,430
APPARATUS FOR PRODUCING AND STORING CARBONATED WATER
Filed Jan. 7, 1939  2 Sheets-Sheet 1
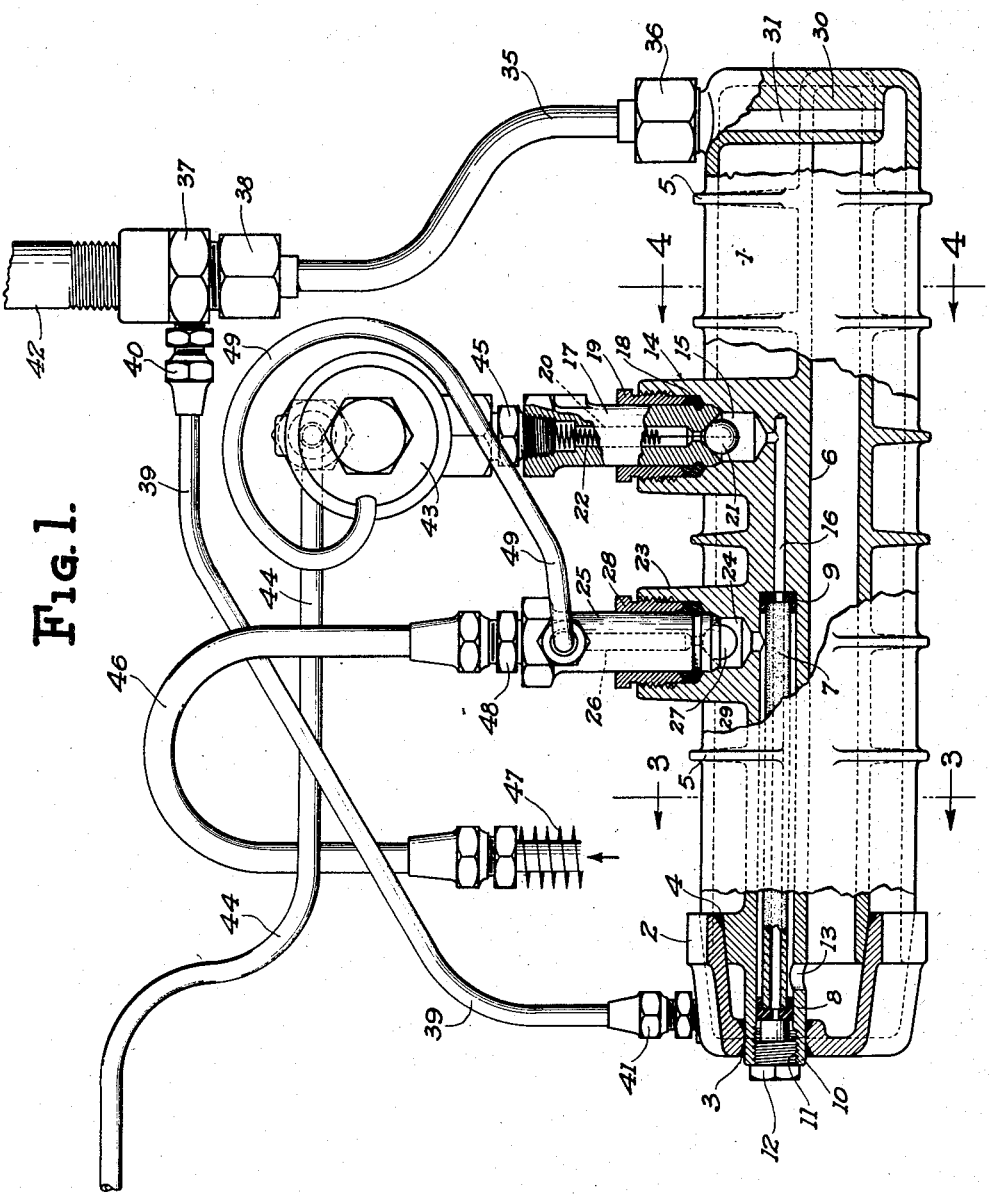
INVENTOR.
Cyril P. Deibel
BY Hull, Brock & West
ATTORNEYS.

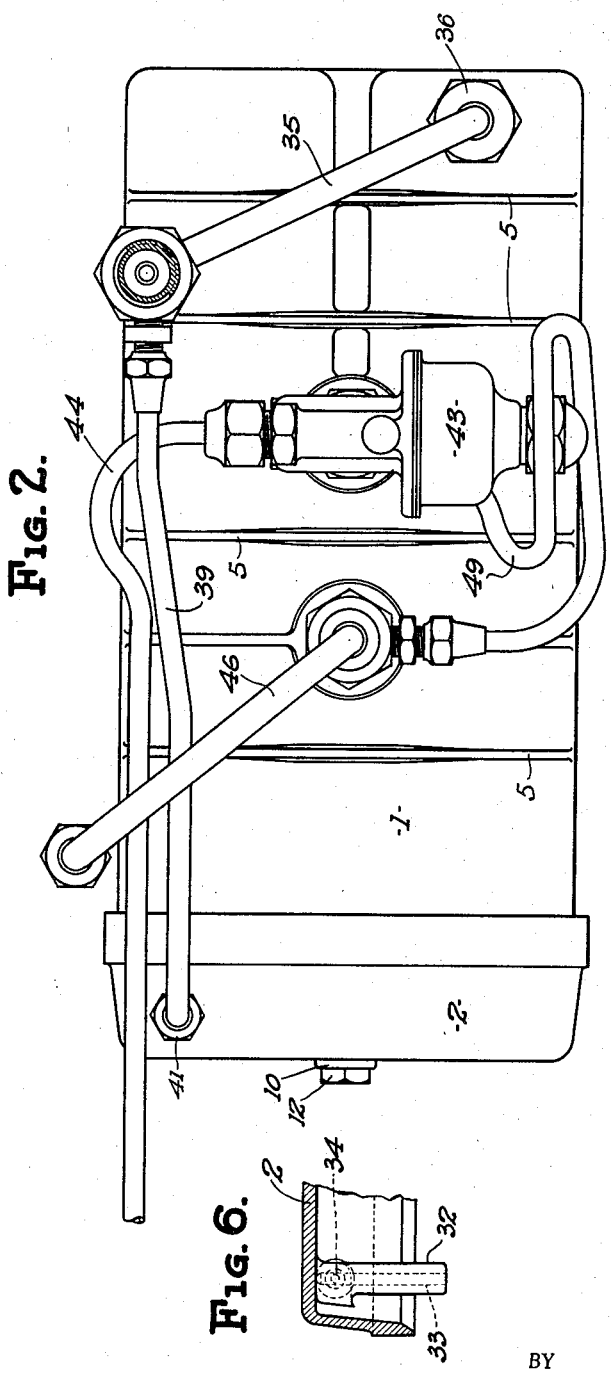
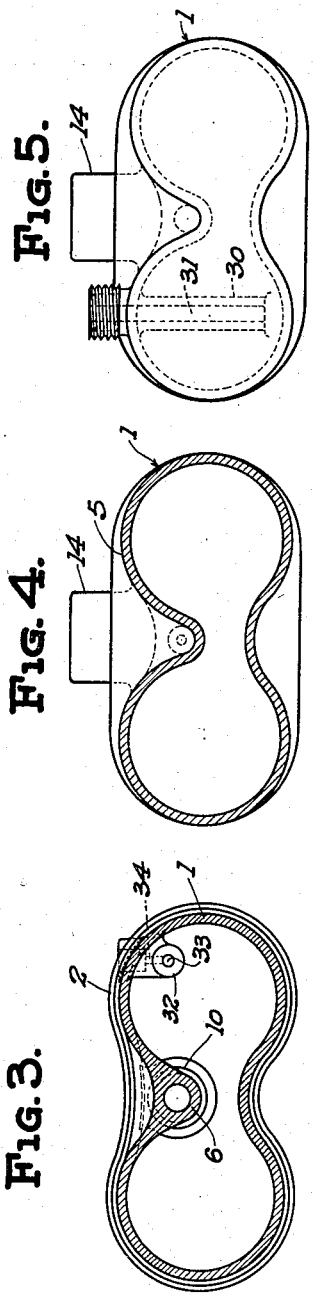

Patented May 21, 1940

2,201,430

UNITED STATES PATENT OFFICE 2,201,430

APPARATUS FOR PRODUCING AND STORING CARBONATED WATER

Cyril P. Deibel, Lakewood, Ohio

Application January 7, 1939, Serial No. 249,790

4 Claims. (Cl. 261—11)

This invention relates to a combination carbonating apparatus and storage vessel for carbonated water which is particularly adapted for the preparation and maintenance of chilled carbonated water at soda fountains, bars and the like and which is so constructed and arranged that it occupies very little space and may be positioned within a cooling compartment located immediately adjacent the draft arm from which the carbonated water is to be dispensed.

One of the objects of the invention is to provide a self contained, compact carbonating apparatus for making, storing and cooling carbonated water, the principal parts of which are formed of die castings, the unit being well adapted for quantity production at comparatively low cost.

Another object of the invention is to provide a carbonating apparatus and storage vessel which includes a carbonating chamber which is formed integral with one wall of the storage vessel and which is adapted to supply and to maintain a sufficient quantity of chilled carbonated water of the desired carbon dioxide content and which is provided with means for preventing an excess accumulation of free gas in the storage vessel.

Carbonated water should be dispensed with the highest possible gas content and at as low a temperature as possible. The water should also be delivered to the carbonator as cool as possible, as the amount of carbon dioxide gas which the water will absorb and retain is almost inversely proportional to the temperature of the water. The carbonator should also be located as near as possible to the draft arms from which it is to be dispensed so that it will not have to flow through long pipes which are difficult to maintain cool. Adequate storage capacity for carbonated water should also be provided so that a sufficient quantity of carbonated water remains in the cooler for a sufficient period of time to become properly chilled and to permit the water to absorb an additional amount of gas which accumulates in the upper part of the cooler. The cooler serves as a combination equalizing, cooling and storage vessel. It is necessary to maintain a small amount of free gas in the upper part of the cooler and when the cooler is not maintained sufficiently cool there is a tendency for a relatively large amount of carbon dioxide gas to free itself from the water and to accumulate at the top of the vessel, which will prevent the storage vessel from being filled and refilled to the desired level. In order to prevent this, venting means are provided for venting through the dispensing arm at each dispensing operation the free gas which accumulates in the top of the cooler. The gas vents through the dispensing arm or the connections leading to the dispensing arm through a restricted outlet so that it is mixed with the water being discharged. One of the objects of the invention, therefore, is to provide a carbonating and cooling unit for maintaining and dispensing carbonated water having the aforementioned distinguishing characteristics and advantages.

Another object of the invention is to provide an apparatus for producing, storing and cooling and dispensing carbonated water which includes a carbonating chamber which is formed integral with one wall of the storage vessel and which has therein a porous member through which gas is delivered simultaneously with the delivery of a thin sheet of water over the porous member and which is provided also with means for regulating the gas pressure with respect to the water pressure and means for preventing the accumulation of any excess free gas in the storage vessel.

A still further object of the invention is to provide an apparatus for producing, storing and cooling carbonated water which consists essentially of a single vessel in which the carbonating apparatus proper is disposed and which is so designed and of such size and shape that it may be readily accommodated in the usual cooling compartment provided at soda fountains or bars, all of the parts with which the carbonated water contacts being formed of cast tin or some suitable metal which will not be chemically affected by the carbonated water.

Further and more limited objects of the invention will appear as the description proceeds and by reference to the accompanying drawings in which Fig. 1 is a view partly in section and partly in elevation showing my improved apparatus for producing, storing and cooling carbonated water; Fig. 2 is a top plan view of the apparatus shown in Fig. 1; Fig. 3 is a vertical sectional view on the line 3—3 of Fig. 1 as indicated by the arrows thereon; Fig. 4 is a view similar to Fig. 3 taken on the line 4—4 of Fig. 1 as indicated by the arrows thereon; Fig. 5 is a view in end elevation with the connections removed and disclosing the shape of the apparatus; and Fig. 6 is a detail view partly in elevation and partly in section showing the cap for closing one end of the vessel and the means for venting the storage vessel.

Referring now to the drawings, the apparatus consists essentially of a storage vessel which is made up of a body member 1 which is preferably formed of a single die casting and which is open at one end and closed at its opposite end, the open end of the body member being closed by means of the cap member 2 which is also formed of a single die casting. The cap member 2 is secured to the body member 1 by being soldered at the points indicated by the reference characters 3 and 4. Formed integral with the body member 1 are a plurality of substantially circular ribs 5 which serve to strengthen the body member and to facilitate cooling thereof. The central portions of the top and bottom walls of the body member are projected toward each other thereby to provide a bilobular storage vessel for the carbonated water having the ribs 5 extending substantially therearound and the central inwardly projecting portion of the upper wall of said body member has formed integrally therewith an elongated hollow enlargement 6 which serves to provide a carbonating chamber which receives therein a porous stone 7 which is tubular in shape. Fitting over the opposite ends of the porous stone 7 are a pair of mounting blocks 8 and 9 which are preferably formed of rubber or the like. The carbonating chamber has formed therewith an integral outwardly extending portion 10 which is tubular in shape and which has threads 11 cast thereon. Threadedly received within the outer end of the tubular extension 10 is a plug 12 which abuts the mounting block 8 and serves to hold the porous stone in place. The tubular extension 10 has an opening 13 therein which connects the carbonating chamber with the interior of the storage vessel. Cast integral with the body member 1 is an enlargement 14 which has formed therein a shouldered bore or passageway 15 which communicates with a straight bore 16 which connects with the interior of the porous stone. Secured in the enlargement 14 is a fitting 17 over which is secured a rubber bushing or sleeve 18. Threadedly secured in the enlargement 14 is a plug 19 which bears against the bushing 18. The fitting is provided adjacent the inner end thereof with an annular groove and when the threaded plug 19 is tightened, a part of the rubber sleeve is forced into the annular groove and secures the fitting in place. Extending axially of the fitting 17 is a bore 20 the inner end of which is shaped to provide a tapered valve seat which receives thereover a ball check valve 21 formed of rubber or the like which is held in place by means of a coil spring 22 the outer end of which is received in an enlarged recess provided in the outer end of the fitting. The spring 22 is preferably formed of stainless steel and normally serves to hold the ball check valve 21 on its seat.

Also formed integral with the body member 1 is an enlargement 23 which has therein a shouldered bore or passageway 24 which communicates with the carbonating chamber. Disposed within the bore 24 is a fitting 25 which has a bore 26 extending therethrough. Disposed over the fitting 25 is a rubber sleeve or gasket 27 and threadedly secured in the enlargement 23 is a plug 28. When the plug 28 is tightened, the rubber sleeve or gasket 27 is compressed and a portion thereof engages in an annular groove provided adjacent the inner end of the fitting so that the fitting is held in place. Closing the bore or passageway 26 is a ball check valve 29 formed of rubber or the like which is normally held on its seat by means of a coil spring. The fitting 25 and its associated parts are substantially identical in construction with the fitting 17 and its associated parts. The end wall of the body member 1 is provided with an enlargement 30 through which extends a bore 31 through which the carbonated water is dispensed.

The cap member 2 is also formed as a die casting and has cast integral therewith an inwardly projecting tubular projection 32 which has a bore 33 therein which communicates with an angularly disposed bore or passageway 34 providing means for slowly venting the storage vessel. Leading from the storage vessel is a carbonated water dispensing pipe 35 which is secured in place by a suitable connection 36. The opposite end of the pipe 35 is connected to a union 37 by means of a connection 38. The reference character 39 designates a vent pipe one end of which is connected to the union 37 by means of a connection 40 and the opposite end of which is connected with the bore 34 provided in the cap member 2. A pipe 42 leads from the union 37 and is adapted for connection with the draft arm through which the carbonated water is to be dispensed. The reference character 43 designates a regulator valve for regulating the gas pressure with respect to the water pressure. Leading into the regulator valve is a gas supply pipe 44 the opposite end of which is adapted for connection with a suitable source of carbon dioxide gas. One side of the regulator valve is connected with the fitting 17 by means of a connection 45 so that carbon dioxide gas will be delivered through the valve 20, the bore 21 and the bore 16 to the interior of the porous stone. Water is delivered to the carbonating apparatus by means of a water supply pipe 46. The reference character 47 indicates a finned cooling coil through which water is delivered before it reaches the pipe 46. The opposite end of the pipe 46 is connected with the fitting 25 by a suitable connection 48. Leading from one side of the fitting 25 is a by-pass pipe 49 the opposite end of which is connected with the gas regulator valve 43. The specific details of the gas regulator valve 43 form no part of this invention, as the construction and operation of such a valve are well known to those skilled in the art. It will suffice to state that the gas regulator valve serves to control and to regulate the pressure and rate of flow of the gas delivered through the fitting 17 and bore 20. One side of the gas regulator valve is connected with the water supply line by the pipe 49 so that the gas pressure is regulated with respect to the water pressure. It is necessary that the gas be delivered to the carbonator at a pressure slightly in excess of the water pressure in order to overcome the resistance offered by the porous stone.

In the operation of the device carbon dioxide gas at considerable pressure is delivered through the pipe 44 to the regulator valve 43 and from thence to the gas inlet fitting and through the several bores and passageways to the interior of the porous stone 7. Water is delivered through the water supply pipe 46 and thence through the fitting 25 and over the porous stone simultaneously with the delivery of gas through the porous stone. As the gas regulator valve is in communication with the water supply line through the pipe 49, the pressure at which the gas is delivered through the porous stone will be regulated with respect to the water pressure. It will be seen that the water is delivered over the porous stone in a thin and generally annular sheet while carbon dioxide gas is being diffused through the porous stone. The carbonated water is delivered from the carbonating chamber through the outlet passageway 13 to the interior of the storage vessel. As a certain amount of carbon dioxide gas will not be absorbed by the water, or will free itself from the water, free gas will accumulate in the upper portion of the storage vessel so that the storage vessel therefore cannot become entirely filled with carbonated water. As the water normally remains in the cooling chamber for some considerable period of time, it is further cooled and also absorbs an additional amount of gas which is maintained in the upper part of the cooling chamber. The carbonated water is dispensed from the storage vessel through the pipes 35 and 42 and when the level of carbonated water within the storage vessel falls below the inlet end of the vent passage 33, any free gas remaining in the upper part of the storage vessel will be vented through the passageways 33 and 34 and pipe 39 which has a restricted outlet and is in communication with the draft arm through which the carbonated water is dispensed. It is desirable to have a small head of free gas in the storage vessel but it is necessary to prevent an excess accumulation of free gas in the top of the storage vessel in order to permit the storage vessel to be refilled with carbonated water to the desired level.

The opening in the tubular extension 10 of the carbonating chamber is of such size that the porous stone and the rubber mounting blocks may be removed therethrough for the purpose of replacement or repair. The entire apparatus is self-contained and compact and is of such size that it may well be accommodated in the usual cooling compartment provided at soda fountains, bars or the like. It will be seen that the principal parts of the apparatus aside from the pipes and fittings for connecting the same are formed of die castings which are well adapted for production at comparatively low cost. These parts have sufficient strength and rigidity to withstand the pressures to which they are subjected. The die castings, being formed of block tin, are not chemically affected by the carbonated water. All of the parts with which the carbonated water comes in contact are formed either of block tin, or of stainless steel or are tinned.

It will be noted that the tubular projection 32 containing the gas vent 33 is located within one of the corners of an end of the storage vessel and is spaced from the side and end walls of said corner. This enables the apparatus to operate in either of three positions, viz: (1) while lying flat as shown in Fig. 1; (2) while lying on one side, as shown in Fig. 2, and (3) while standing on end with the gas vent uppermost. Such an apparatus is well adaptable for installation in any restricted cooling chamber.

The bilobular construction of the storage vessel and the arrangement of the cooling ribs cooperate to enable the vessel to be efficiently cooled in the cooling compartment wherein it is placed.

It will now be clear that I have provided an apparatus for producing, storing and cooling carbonated water which will accomplish the objects of the invention as hereinbefore stated. It is to be understood that the embodiment of the invention herein disclosed is to be considered merely as illustrative and not in a limiting sense as various changes may be made in the details of construction and arrangement of parts without departing from the spirit of my invention. The invention is therefore limited only in accordance with the scope of the appended claims.

Having thus described my invention, what I claim is:

1. In an apparatus for producing and storing carbonated water, the combination of a storage vessel, a carbonating chamber formed integral with one wall of said storage vessel and lying within the contour thereof and disposed in open communication with said storage vessel, means for dispensing carbonated water from said storage vessel, means for preventing any excess accumulation of free gas within said storage vessel, said storage vessel having formed integral therewith a plurality of fins which serve to strengthen said storage vessel and to facilitate cooling thereof.

2. In an apparatus of the character set forth, the combination of a storage vessel having sides, ends and top and bottom walls connecting said sides and ends, a carbonating chamber disposed within and in open communication with the interior of said vessel, means for supplying gas and water to said carbonating chamber, means for delivering carbonated water from said vessel, and a tubular vent connected with the top wall and located within one of the end corners of said vessel and having its receiving end spaced from the side and end walls of said corner whereby the said vent may be operative with the vessel supported in a cooling chamber with its bottom, or the side remote from said corner or the end remote from said corner in a substantially horizontal position.

3. In an apparatus of the character set forth, the combination of a storage chamber having the central portions of opposed walls projecting toward each other thereby to provide a bilobular shape for said chamber, a carbonating chamber disposed within and in open communication with said chamber, means for supplying gas and water to said chamber and means for delivering carbonated water from said chamber, the bilobular compartments being provided with temperature-interchanging and strengthening ribs extending substantially therearound.

4. In the combination set forth in claim 3, the carbonating chamber being formed integrally with the inwardly projecting portion of one of said opposed walls.

CYRIL P. DEIBEL.